United States Patent [19]

Fieldhouse et al.

[11] Patent Number: 4,465,535

[45] Date of Patent: Aug. 14, 1984

[54] ADHERING CURED POLYMERS OR PREPOLYMERS TO HIGH NATURAL RUBBER CONTENT ELASTOMER

[75] Inventors: John W. Fieldhouse, Mogadore; Russell W. Koch, Hartville; James Oziomek, Akron, all of Ohio

[73] Assignee: The Firestone Tire & Rubber Company, Akron, Ohio

[21] Appl. No.: 531,317

[22] Filed: Sep. 12, 1983

[51] Int. Cl.³ .................... B29H 5/16; B60C 21/02; B60C 21/06

[52] U.S. Cl. ........................... 156/97; 156/94; 156/95; 156/98; 156/307.3; 156/307.5; 156/326; 427/140; 152/330 R; 152/370; 428/423.9; 428/492

[58] Field of Search ............ 156/94, 95, 97, 96, 156/98, 110.1, 115–116, 307.3, 307.5, 325–326; 152/330 R, 374, 367, 370, 371; 427/140; 428/423.1, 423.9, 424.8, 411, 413, 520, 521, 522–523, 492

[56] References Cited

U.S. PATENT DOCUMENTS

| 3,644,256 | 2/1972 | Broisman | 524/510 |
|---|---|---|---|
| 3,718,587 | 2/1973 | Bhakuni et al. | 252/8.6 |
| 3,755,261 | 8/1973 | VanGulick | 528/60 |
| 3,779,794 | 12/1973 | De Santis | 428/422.8 |
| 3,834,934 | 9/1974 | Broisman | 525/133 |
| 3,888,831 | 6/1975 | Kogon | 528/48 |
| 3,966,530 | 6/1976 | Cutts et al. | 156/314 |
| 3,991,255 | 11/1976 | Blaskiewicz et al. | 428/424.8 |
| 4,048,253 | 9/1977 | Ooba et al. | 524/500 |
| 4,071,492 | 1/1978 | Bethea et al. | 524/775 |
| 4,085,283 | 4/1978 | Den Otter et al. | 544/214 |
| 4,125,522 | 11/1978 | Becker | 528/61 |
| 4,136,219 | 1/1979 | Odam | 427/385.5 |
| 4,311,181 | 1/1982 | Hausch | 152/353 R |
| 4,327,138 | 4/1982 | Hausch | 428/36 |
| 4,434,832 | 3/1984 | Koch et al. | 156/97 |

Primary Examiner—Lois E. Boland
Attorney, Agent, or Firm—Frank J. Troy, Sr.

[57] ABSTRACT

In repairing articles of natural rubber or elastomer predominantly of natural rubber with cured polymer or prepolymer (polyurethane/polyurea), adhering advantages are obtained especially at elevated temperatures when the damaged area is treated with halogen-containing oxidant dissolved in 1,2-dichloroethane instead of other solvents.

9 Claims, No Drawings

ADHERING CURED POLYMERS OR PREPOLYMERS TO HIGH NATURAL RUBBER CONTENT ELASTOMER

DESCRIPTION

1. Technical Field

This invention relates to repairing articles of natural rubber or of high natural rubber content with polyurethane/polyurea.

It is especially useful for repairing cuts, gouges, and/or holes in tires, e.g. very large tires such as off-road tires of construction vehicles.

It is also useful, for example, for repairing damaged conveyor belts, hoses, rubber boots and the like and for the application of tire treads or lugs.

2. Background Of The Invention

Conventionally, articles of high natural rubber content are repaired by utilizing uncured gum rubber in conjunction with a mold and application of heat. This method is very cumbersome especially in regard to very large tires, such as those of off-road vehicles, which are, for example, 10 feet in diameter.

In view of the above, consideration has been given to repairing methods which are operative at ambient temperature so as to allow dispensing with heat and molding apparatus thereby allowing repairs in the field and eliminating the need of transporting to a repair shop.

The application of Koch and Fieldhouse, Ser. No. 531,321, filed concurrently herewith discloses use of hypochlorous acid treating agent as part of a repair process which can be carried out at ambient temperature.

Hausch U.S. Pat. No. 4,327,138 discloses an ambient temperature repair method where amine cured urethane polymer or prepolymer is used as the repair agent after chemically treating the elastomer surface to be repaired with halogen-containing oxidant (e.g. trichloro-s-triazinetrione) dissolved in a solvent (ethyl acetate) and acetone are mentioned). The Hausch process wherein trichloro-s-triazinetrione dissolved in ethyl acetate is utilized provides very adequate adhesion between the elastomer and the plyurethane/polyurea repair agent when the elastomer is polybutadiene or poly(-styrenebutadiene) but in application to articles of natural rubber or natural rubber containing elastomers provides lower adhesion performance especially at higher temperatures (e.g. at tire running temperatures) whereby peeling or delamination may occur. The substitution of acetone, the other solvent mentioned in Hausch, for the ethyl acetate does not cure this deficiency.

SUMMARY OF THE INVENTION

It has now been discovered that substitution of 1,2-dichloroethane as the solvent for the treating agent results in excellent adhesion properties between the natural rubber or high rubber content elastomer and the repair agent (i.e. the cured amine-cured polymer or prepolymer) even on exposure to high temperatures, whereby risk of peeling or delamination is substantially mitigated.

Thus, the process herein is for repairing damaged articles of cured elastomer selected from the group consisting of natural rubber and blends thereof with up to about 30% by weight of the blend of synthetic rubber.

This process comprises the steps of
(a) cleaning the area to be repaired;
(b) applying to that area a halogen-containing oxidant dissolved in 1,2-dichloroethane;
(c) applying to oxidant-treated area an amine curable polymer or prepolymer and an amine curing agent in a polar solvent;
(d) and curing the amine curable polymer or prepolymer at ambient temperature; whereby the cured polymer or prepolymer is bonded to said elastomer.

Preferably, the halogen-containing oxidant is trichloro-s-triazinetrione (also known as trichloroisocyanuric acid), the amine curable polymer is a polyurethane, the amine curing agent is 4,4'-methylene dianiline, the polar solvent is acetone and the curing period is 16 to 24 hours.

DETAILED DESCRIPTION

The greatest advantage, i.e. the greatest improvement in adhesion and resistance to delamination compared to results with the ethyl acetate and acetone solvents described in Hausch U.S. Pat. No. 4,327,138 is obtained when the article to be repaired is entirely of natural rubber. The term "natural rubber" is used herein to mean elastomeric substances obtained from trees and plants.

However, the problems associated with using the ethyl acetate and acetone solvents for the oxidant are present even though some of the natural rubber is replaced by synthetic rubber and thus blends of natural rubber and synthetic rubber have been included herein with greater advantage being obtained as the percentage of natural rubber increases, e.g. from about 70% to about 80%, etc. and upward. The synthetic can be any of those normally blended with natural rubber, e.g. polybutadiene, polystyrene-butadiene, neoprene and EPDM elastomers.

Turning now to the process herein, the steps of cleaning the area to be repaired constitutes cleaning the surface as by buffing and/or treatment with a conventional organic solvent. Another method of cleaning involves skiving the surface, that is, cutting and removing a portion of the surface as for example in the situation where the surface contains an opening.

The halogen-containing oxidant and 1,2-dichloroethane solution is applied to cleaned area in any conventional manner as through brushing, spraying and the like and is applied in sufficient amount to coat the cleaned area. Preferably two or more coats are utilized to ensure that all the cleaned area, i.e. the area to which amine curable polymer or prepolymer repair composition is to be applied, has been coated. The coating dries within a matter of minutes whereupon the amine curable polymer of prepolymer repair composition can be applied.

The halogen-containing oxidant is normally about 0.01% to about 10% by weight of the solution, preferably from 0.05% to about 5% by weight of the solution.

The halogen-containing oxidant is selected from the group consisting of N-halosulfonamides, N-halohydantoins, N-haloamides, and N-haloimides. Examples of N-halosulfonamides include N,N,N',N'-tetrachlorooxybis (benzenesulfonamide); N,N,N',N'-tetrachloro-4,4-biphenyl disulfonamide, N,N,N',N'-tetrachloro-1,3-benzene disulfonamide; and N,N,N',N'-tetrabromooxybis(benzenesulfonamide). Examples of N-halohydantoins include 1,3-dichloro-5,5-dimethyl hydantoin; 1,3-dibromo-5,5-dimethyl hydantoin; 1,3- dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various mono-, di- and trichloroisocyanuric acids or combinations thereof. The preferred halogen-containing oxidant for use herein is trichloroisocyanuric acid which is also known as trichloro-s-triazinetrione or more specifically as 1,3,5-trichloro-s-triazine-2,4,6-trione.

The 1,2-dichloroethane solvent is critical to the invention as the substitution of this solvent for the previously disclosed ethyl acetate or acetone is responsible for the improved adhesion of the cured polymer or prepolymer repair agent to the natural rubber or natural rubber blend article being repaired whereby there is significantly less chance of delamination at elevated temperatures.

The amine-curable polymer or prepolymer together with the amine curing agent form the curable polymer system which in admixture with polar solvent provides a liquid system which is applied to the cleaned activated portion of the natural rubber or natural rubber blend article to be repaired. The admixture of these ingredients is readily accomplished in conventional mixers such as dough mixers, high speed impellers, paddle-type mixers and the like. Small batches can be mixed by stirring with a spatula. Cure of the curable polymer or prepolymer commences upon admixture of the three ingredients so the mixing step should not be of a length of time such that any significant cure occurs during mixing. The admixture is readily applied to the portion of the article to be repaired by coating, pouring, casting, molding or the like.

A plasticizer can optionally be included in the admixture to facilitate processing. An optional ingredient can also be included to reduce cure time.

The equivalent weight of the amine curing agent with regard to the curable polymer or prepolymer normally ranges from about 85% to about 115%, with from about 95% to about 105% being preferred.

Ordinarily the amount of polar solvent per 100 parts by weight of the curable polymer or prepolymer ranges from about 2 to about 20, more preferably from about 5 to 15.

Preferred amine curable polymers or prepolymers are urethanes, especially polyurethanes. These can be formed by reacting a polyether polyol or a polyester polyol with a molar excess of an organodiisocyanate to form a prepolymer having terminal isocyanato groups; curing can be carried out to increase the molecular weight from less than about 3,000 upwards to over 10,000 to form polymer. Examples of such polymers are set forth in U.S. Pat. Nos. 2,620,516; 2,777,831; 2,843,568; 2,866,774; 2,900,368; 2,929,800; 2,948,691; 2,948,707; and 3,114,735, all of which are hereby fully incorporated by reference. Typical specific examples of such polyurethanes include Adiprene L-367, polytetramethylene ether glycol containing approximately 6.4 percent isocyanate end groups by weight, manufactured by DuPont; Adiprene L-42, polytetramethylene ether glycol containing approximately 2.8 percent isocyanate end groups by weight, manufactured by DuPont; and Cyanaprene A-7, a polyester based coating polymer with approximately 2.4 percent isocyanate end groups, manufactured by American Cyanamid. Blends of these polyurethanes are readily utilized.

Other amine curable polymers or prepolymers include the compounds set forth in U.S. Pat. No. 3,755,261 which is hereby fully incorporated by reference. Briefly, such compounds are the various epoxy resins such as those disclosed in the "Encyclopedia of Polymer Science and Technology" Interscience Publishers, New York (1967), Volume 6, pages 212-221; halogen-containing hydrocarbon polymers such as chloroprene polymers, chlorinated butyl rubber, and chlorinated polyethylene and polypropylene; chlorosulfonated polymers such as those described in U.S. Pat. No. 2,723,257; polymers containing acid halide groups such as

and haloformate groups such as

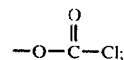

polymers containing anhydride groups which on reaction with diamines yield amide-acid linkages, and organopolysiloxanes as described in U.S. Pat. No. 2,938,010.

The amine curing agents can be, for example, any of such agents known or useful for such purpose. A multiplicity of such are well known. Preferred ones include a complex of 4,4'-methylene dianiline (MDA) and a salt, or a complex of racemic 2,3-di-(4-aminophenyl) butane and a halide salt, as set forth in U.S. Pat. No. 3,755,261 to VanGulick which is hereby fully incorporated by reference. The methods for preparing the complexes are set forth in U.S. Pat. No. 3,755,261. A preferred salt utilized with the 4,4'-methylene dianiline compound is sodium chloride or lithium chloride. Due generally to availability and costs, the complexes or salts derived from 4,4'-methylene dianiline are highly preferred. Another class of amine curing agents which are especially useful are the various Versamids, that is the condensation products of polyamines and dibasic acids obtained when certain unsaturated fatty acids are polymerized, and are manufactured by General Mills Chemical Company.

Suitable polar solvents for the admixture are set forth in U.S. Pat. No. 3,888,831 to Kogon which is hereby fully incorporated by reference. Preferred solvents include dimethylformamide, tetrahydrofuran, cyclohexanone, ethyl acetate, nitromethane, nitroethane, nitropropane, and more preferably methyl ethyl ketone and acetone.

Preferred plasticizers include dioctylphthalate and tetraethylene glycol bis (2-ethyl hexanoate). MDA-salt (sodium chloride) complex in combination with dioctylphthalate (50% weight basis) is sold under the name Caytur 21. The tetraethylene glycol bis (2-ethyl hexanoate) is marketed by Union Carbide under the name Flexol 4-GO.

A preferred cure time reducing agent is tributylphosphate used at a level of 0.1% to 10%, more preferably from 0.5% to 5%, based on the total weight of curing agent and tributylphosphate.

Curing is readily carried out at ambient or room temperature, that is, the odinary prevailing temperatures as from about 10° C. to about 50° C. Often ambient temperature will range from about 15° C. to about 35° C. or 40° C. Curing times ordinarily range from about 12 hours to about 72 hours with 16 to 24 hours being preferred. Curing is ordinarily carried out simply by maintaining the cure composition coated article at ambient temperature during a period as aforestated.

The repaired article is essentially a laminate of cured polymer or prepolymer bonded to a narrow layer of activated surface. The cured coating is a polyurethane/polyurea. The bond has excellent adhesion characteristics even at higher temperatures (e.g. tire running temperatures, such as about 250° F.).

The invention is illustrated in the following specific examples:

EXAMPLE I

Each test specimen was a peel adhesion pad of natural rubber (100 gauge) reinforced with nylon mesh. Each pad was treated as follows: The surface was buffed, then washed with acetone on Rymplecloth and then allowed to dry. The cleaned surface was then primed with 3% trichloroisocyanuric acid (trichloro-s-triazinetrione) in solvent as specified below. Three coats were applied. The coating was allowed to dry. Then the cleaned, primed surface was coated with a formulation of 50/50 Adiprene L-42 and Adiprene L-367 (150 grams each), admixed with Caytur 21 (71 grams), acetone (30 grams) and Flexol 4-GO (30 grams), each nylon mesh reinforcing is placed in the coating, and the coating is kept slightly apart from the pad at one end. The coated pad is allowed to cure 24 hours at room temperature resulting in the coating being bonded to the pad over most of the pad but with the coating and pad being apart for a short distance at the one end to provide a split in the assembly. Each pad was cut into one inch strips and each strip was subjected to pulling at the split utilizing an Instron Tester to measure in pounds per inch the force required to pull the coating and pad apart. For each pad two strips were tested at room temperature and two strips were tested at 212° F. (as an indication of what would happen at running temperatures) and the values below represent the average of the data on each set of strips. A difference of 10-15 on the Instron Tester results indicates a difference in an actual repair situation.

Testing was carried out with the primer solvents 1,2-dichloroethane, ethyl acetate and acetone and results were as follows:

| | Peel Adhesion Data (lbs./in.) | |
|---|---|---|
| Primer Solvent | Room Temperature | 212° F. |
| 1,2-dichloroethane | 75.5 | 41 |
| ethyl acetate | 38 | 5.5 |
| acetone | 9.25 | 7 |

As indicated above, the use of 1,2-dichloroethane provides a pronounced difference especially at the elevated temperature.

EXAMPLE II

This example was carried out the same as Example I except that cyclohexane was used in the cleaning step instead of acetone.

Results were as follows:

| | Peel Adhesion Data (lbs./in.) | |
|---|---|---|
| Primer Solvent | Room Temperature | 212° F. |
| 1,2-dichloroethane | 81.5 | 39.5 |
| ethyl acetate | 34 | 5 |

EXAMPLE III

This example was carried out similar to Example I. Results were as follows:

| | Peel Adhesion Data (lbs./in.) | |
|---|---|---|
| Primer Solvent | Room Temperature | 212° F. |
| 1,2-dichloroethane | 65 | 48 |
| ethyl acetate | 47.5 | 15 |

EXAMPLE IV

This example was carried out similar to Example I except that the pad was 80% natural rubber, 20% synthetic and the primer solvent was ethyl acetate:

| | Peel Adhesion Data (lbs./in.) | |
|---|---|---|
| Primer Solvent | Room Temperature | 212° F. |
| ethyl acetate | 147.5 | 35 |

Substitution of 1,2-dichloroethane for ethyl acetate provides improved results at the 212° F. temperature.

EXAMPLE V

An exterior cut in a 36.00×51 hauler tire (OTR, off-the-road) was repaired in the following manner using the composite type urethane repair. The cut (commonly known as a spot repair) was buffed thoroughly, making sure the injury was free of any loose rubber particles or cuts or gouges. The buffing was to an RMA #3 or #4 buff rating. The cut was washed thoroughly with acetone on a piece of Rymplecloth and the acetone was allowed to dry completely. The surface was then coated with several coats of a 3 percent trichloro-s-triazine-trione in 1,2-dichloroethane with each coat being allowed to dry before the next coat was applied. After the last coat had dried, a 50/50 kit was mixed and poured or placed into the cut. The 50/50 kit consisted of two components.

| COMPONENT A | COMPONENT B |
|---|---|
| Adiprene L-42 (150 gm) | Caytur 21 (72 gm) |
| Adiprene L-367 (150 gm) | |
| Flexol 4-GO (30 gm) | |
| Acetone (30 gm) | |

The mixing procedure consisted of thoroughly mixing A with B. The mixed material was then poured into the cut. The surface was taped in order to promote the ambient cure by containing the acetone. The repair was allowed to cure for 24 hours at ambient temperature. After the required time of cure, the tape was removed and the tire was ready for service.

After 1326 hours of testing, the repair was better than a control.

Similarly good results are obtained when the 1,2-dichloroethane is used with N,N,N',N'-tetrachloro-oxy-bis (benzene sulfonamide) or 1,3-dichloro-5, 5-dimethyl hydantoin or N-bromoacetamide instead of with trichloroisocyanuric acid.

While the foregoing describes certain preferred embodiments of the invention, modifications will be readily apparent to those skilled in the art. Thus, the scope of the invention is intended to be defined by the following claims.

What is claimed is:

1. A process for repairing damaged articles of cured elastomer selected from the group consisting of natural rubber and blends thereof with up to about 30% by weight of synthetic rubber, said process comprising the steps of
   (a) cleaning the area to be repaired;
   (b) applying to that area a halogen-containing oxidant dissolved in 1,2-dichloroethane;
   (c) applying to said oxidant-treated area an amine curable polymer or prepolymer and an amine curing agent in polar solvent;
   (d) and curing the amine curable polymer or prepolymer at ambient temperature; whereby the cured polymer or prepolymer is bonded to the elastomer.

2. The process of claim 1, wherein the process is for patching tires.

3. The process of claim 2, wherein the cured elastomer comprises at least about 80% natural rubber.

4. The process of claim 3, wherein the halogen-containing oxidant is selected from the group consisting of N-halosulfonamides, N-halohydantoins, N-haloamides and N-haloimides.

5. The process of claim 4, wherein the halogen-containing oxidant is selected from the group consisting of N-haloimides.

6. The process of claim 5, wherein the halogen-containing oxidant is trichloro-s-triazinetrione.

7. The process of claim 6, wherein the cured elastomer is natural rubber.

8. The process of claim 7, wherein the amine curable polymer or prepolymer is polyurethane.

9. The process of claim 8, wherein the curing agent comprises 4,4'-methylene dianiline and the polar solvent is acetone.

* * * * *